Dec. 11, 1923.
J. J. MOJONNIER ET AL
1,476,996
AGITATOR
Filed May 29, 1922   2 Sheets-Sheet 2
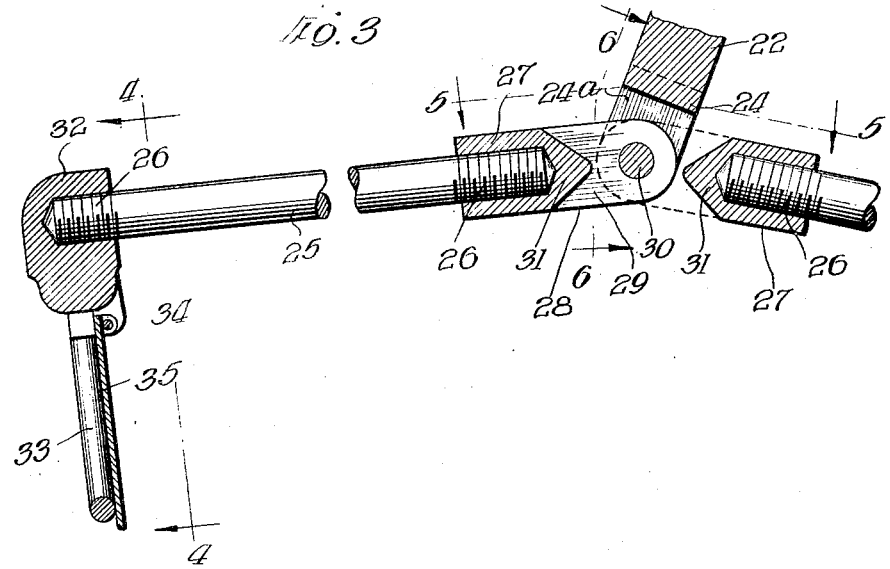
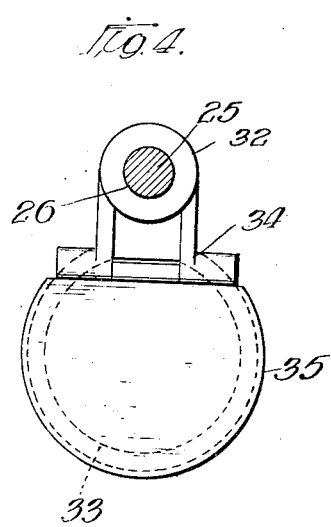
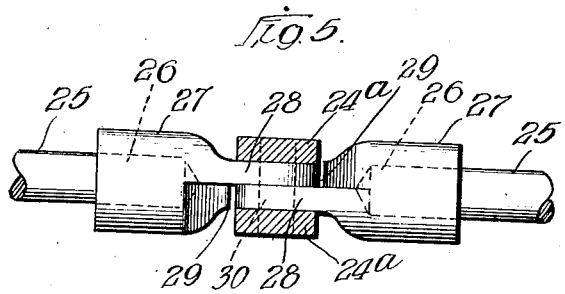
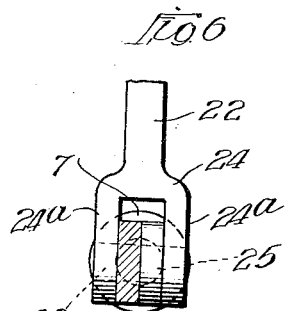
Witnesses:
Harry B. White
W. F. Kilroy
Inventors:
Julius J. Mojonnier
Harley R. Phillips.
By Charles S. Elliott
Atty.

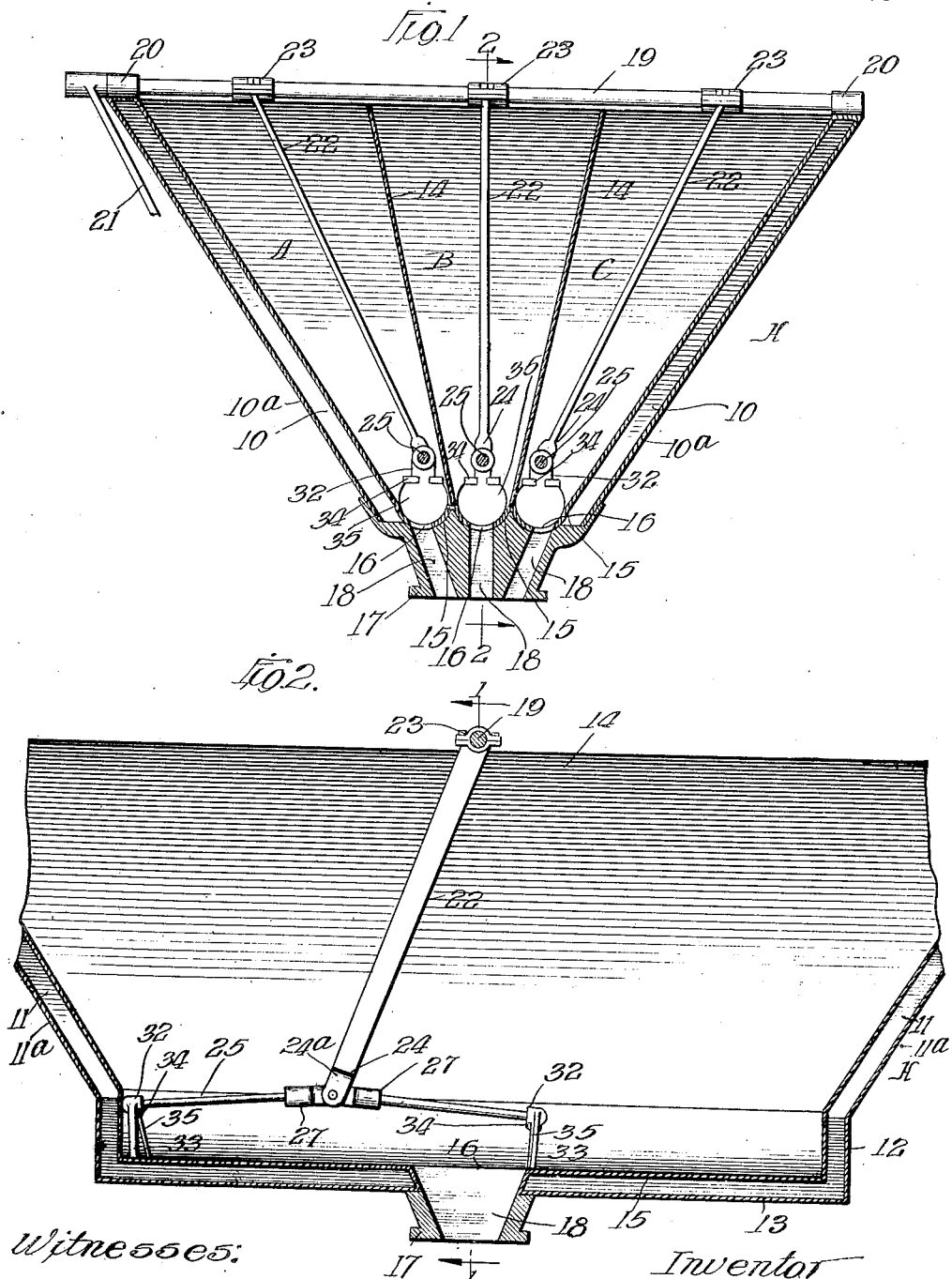

Patented Dec. 11, 1923.

1,476,996

UNITED STATES PATENT OFFICE.

JULIUS JOHN MOJONNIER AND HARLEY RAY PHILLIPS, OF OAK PARK, ILLINOIS, ASSIGNOR TO MOJONNIER BROS. CO., OF CHICAGO, ILLINOIS, A CORPORATION OF ILLINOIS.

AGITATOR.

Application filed May 29, 1922. Serial No. 564,633.

*To all whom it may concern:*

Be it known that JULIUS J. MOJONNIER and HARLEY R. PHILLIPS, both citizens of the United States, and residents of Oak Park, in the county of Cook and State of Illinois, have invented certain new and useful Improvements in Agitators, of which the following is a specification.

This invention relates to agitators and is particularly designed for use in conjunction with a hopper having an outlet and discharge opening through which the hopper contents are precipitated, it being the object of the present agitator not only to maintain a constant movement on the part of the hopper contents but to also direct such movement toward the discharge and outlet opening.

With the above and other objects in view, as will be apparent, this invention consists in the construction, combination and arrangement of parts all as hereinafter more fully described, claimed and illustrated in the accompanying drawings, wherein:—

Fig. 1 is a transverse section taken along line 1—1 of Fig. 2 through a multiple compartment hopper illustrating the present invention operating in conjunction with the compartments thereof.

Fig. 2 is a central vertical section taken through one of the hopper compartments along line 2—2 of Fig. 1 and discloses the co-operation between a single agitating unit and its compartment.

Fig. 3 is a fragmentary longitudinal section, parts being shown in elevation, of the agitator.

Fig. 4 is a section taken along line 4—4 of Fig. 3 to illustrate the construction and mounting of one of the agitator blades in elevation.

Fig. 5 is a horizontal section, partly in elevation, along line 5—5 of Fig. 3 and shows the mounting of the agitator arms and the connection thereof to the operating bar.

Fig. 6 is a vertical section taken along line 6—6 of Fig. 3 to illustrate a detail of the connection between the operating bar and the agitator arms.

While the present invention is capable of general use and application, it is particularly designed for use in conjunction with hoppers adapted to contain and discharge ice cream and like frozen or whipped products. In the drawings, it is illustrated as functioning with a multiple compartment hopper forming a part of an ice cream packaging machine by means of which the ice cream is packaged in a container in a series of varying colored or flavored layers. In a machine of this character, the discharge opening in each compartment is relatively small when compared to the length of the hopper bottom and hence it is one of the objects of the present agitator to constantly move the mass of ice cream within the hopper compartments toward this discharge opening to insure the complete discharge thereof.

Ice cream during all of its processes of production prior to being placed in the hardening room is in either a liquid or decidedly plastic condition, i. e., it is not the hard, frozen article known to the consumer. During freezing, the liquid ice cream mix is churned or whipped, increasing in volume occupied during this operation and on being withdrawn from the freezer is in a highly viscous plastic condition. If not maintained at substantially its temperature on leaving the freezers, it will revert to a liquid or at least will lose parts of its increased volume, known as overrun, created by the air whipped into it while contained in the freezer.

Hence, as it is necessary to refrigerate the hopper contents to maintain the proper temperature thereof, the mass is very likely to become set and hard particularly adjoining the hopper walls which condition will prevent or hinder its flowing through the discharge or outlet opening. Therefore, in addition to constantly moving the hopper contents toward the discharge or outlet opening, the present invention is designed to keep the entire mass from setting, freezing, hardening or adhering to the hopper walls.

While the present invention has been described and illustrated in its particular adaptation to hoppers for handling ice cream, it is capable of and is intended for general use where it is desired to keep the contents of a container in motion and toward an outlet or discharge opening.

In Figs. 1 and 2 of the drawings is illustrated the hopper structure, designated generally as H with which the present invention co-operates. This hopper H comprises a double outer side wall 10 occupying a plane oblique to the horizontal and connected one to the other by the double end walls 11 likewise positioned in a plane oblique to the horizontal. At their lower edges, the outer plates 10a and 11a of the double walls assume substantially vertical positions creating a pocket 12 substantially rectangular exteriorly and having a double bottom 13, adjoining what would be the point of convergence of the side walls 10. A refrigerating agent, such as brine, is circulated through the space within the double walls 10, 11 and 13 to maintain the contents of the hopper at the proper temperature. Between the side walls 10 and extending from one end wall 11 to the other is a series of partitions 14, shown here as two in number, which are arranged to converge at what would be the common point of convergence between the walls 10. The number of these partitions may be increased or decreased, or they may be entirely eliminated without departing from the spirit and scope of this invention. The illustrated arrangement of the hopper H shows two such partitions 14 creating three compartments A, B and C in combination with the side walls 10. Each of these compartments A—B—C has a semicircular bottom 15 in the pocket 12 and forming a part of the inner plate of the double bottom 13.

Medially of the hopper length are the discharge or outlet openings 16, one for each of the compartments A, B and C, said openings being aligned with each other transversely of the hopper. These outlet or discharge openings 16 co-operate with a feed block 17 which has passages 18 therein forming continuations of the discharge or outlet openings whereby the hopper contents may be conducted to the machine functioning with the hopper or to any other desired point. The feed block 17 is set in the outer wall plate of the bottom 13 and as shown in Fig. 1 embraces and supports the hopper.

The agitator, forming the subject matter of the present invention, is supported and operated by the shaft 19 mounted in the bearings 20, which are secured to the upper edges of the outer walls 10 at a point in approximately the central vertical transverse plane of the outlet or discharge openings 16. One end of this shaft 19 extends beyond the adjoining wall 10, where it has a rocker arm 21 fixed thereto, said rocker arm at its opposite end co-acting with any suitable mechanism for imparting an oscillatory movement to said shaft through said arm.

An operating arm 22 is fixed to the shaft 19 by the clamp 23 at the outer end of said arm, one arm 22 being provided for each of the compartments A, B and C. In the central compartment B, the arm 22 occupies a substantially vertical plane; while in the flanking compartments A and C, the arms 22 co-operating therewith occupy planes angular to both the vertical and horizontal planes to accommodate the oblique walls of the compartments; but in all cases the clamps 23 are located on the shaft 19 at approximately central points in the widths of the compartments adjacent the shaft. In the event the compartments are rectangular or in the event there is only one compartment, the arms 22 may occupy vertical planes; in other words, the position occupied by the arms 22 conforms to the shape and arrangement of the hopper or compartments thereof if any.

As the shaft 19 oscillates in its bearing 20 under the impetus of the rocker arm 21, the operating arms 22 swing within the compartments A, B and C imparting a degree of movement to the contents thereof, and carry the directing and agitating mechanisms mounted at their free ends through the mass to not only supplement the agitation caused by the arms 22 but also to direct the movement toward the discharge or outlet openings 16 or other predetermined point.

Inasmuch as the agitating units are all duplicates, except perhaps in adjustment, a description of the structure of one unit will suffice for all. At its free or swinging end, the operating arm 22 is provided with a fork 24, the arms 24a of which are parallel one to the other and pivotally carry between them the agitating arms or rods 25.

Located on each side of the fork 24 and extending longitudinally of the hopper or the co-operating compartment, is an agitating arm or rod 25 threaded, as at 26, at both of its ends. On the inner end of the arm or rod 25 is threaded a collar 27, closed at one end and having an orificed lug 28 projecting from such closed end B, said lug 28 being cut away, as at 29, on one side. The orificed lugs 28 of both the rods or arms 25 are received between the arms 24a of the fork 24, the latter being also provided with openings for registration with the orifices in said lugs and the reception of a pivot pin 30, whereby the arms or rods 25 are pivoted to the lower end of the operating arm 22. By reference to Fig. 5, it will be observed that the lug 28 of one collar 27 is received in the cut-away portion 29 of the co-operating lug 28 of the other collar, thus producing a type of interlocking pivotal connection or co-action between said lugs and necessarily between the collars thereof. For the greater freedom of the pivotal movement of the collars 27, the ends of the collars adjoining the cut-away portions 29 of the lugs 28 are beveled, as at 31, toward the pivot pin 30, thereby removing the limiting factor on the relative movement between the rods 25 and between them and the arm 22, in the event the ends of the collars 27 adjacent the lugs 29 were square.

At the outer or free end of each rod or arm 25 is an interiorly threaded socket 32 in which is received the adjoining threaded end 26 of the arm or rod 25. This socket 32 carries an open bearing member 33 on one side thereof in a plane substantially at right angles to the arm or rod 25, said member being of a shape and size to conform to the shape and contour of the hopper or compartment bottom 15; here shown as being semi-circular and hence the bearing member 33 is illustrated in the form of a ring. Each rod or arm 25 carries a bearing member 33 and as there are two rods or arms 25 in each unit there are two bearing members 33 in each, one on each side of the operating arm 22 at the extreme horizontal limits of the unit. Mounted on the face of each bearing member toward the operating arm 22 by means of the hinge 34 at or adjoining the socket 32, is a solid gate valve 35 of a somewhat greater size than the bearing member 33 and like the bearing member, conforming to the shape and contour of the bottom 15 of the compartment or hopper.

In the present adaptation of this invention, it will be observed from Fig. 2 of the drawings that the combined length of the rods or arms 25 forming a unit is greater than one-half of the length of the hopper or compartment bottom 15: i. e., the combined length of the rods or arms 25 of a single unit is such that they extend from one end of the hopper or compartment to just beyond the outlet or discharge opening 16 when the operating arm is at each end of its path of swinging movement.

From the foregoing, it is manifest that as the operating arm 22 swings in the hopper or compartment under the impetus of the shaft 19, the entire mechanism, consisting of the rods 25, collars 27, sockets 32, bearing members 33, gate valves 35, etc., carried at the lower end of the arm 22, will reciprocate on the bottom 15 of the hopper or compartment, the arc of the swing of the terminal of the arm 22 being accommodated by the pivotal connection between the collars 27 and said arm. Thus the constant agitation within the hopper H by the arm 22 is supplemented by that of the elements carried by said arm and a constant movement of the hopper contents results which overcomes the tendency thereof to set or adhere to the hopper walls.

As the elements carried by the arm 22 move from one end of the hopper bottom 15 to the other, they create a movement of the hopper contents toward and to the outlet or discharge opening 16. This is accomplished through the instrumentality of the gate valves 35, one of which opens and the other closes, alternately during the reciprocation along the bottom 15 of the hopper. By reference to Fig. 2, it will be seen that as the unit moves away from the end of the hopper, it there occupies, the gate valve 35 at the right will open under pressure thereon of the contents passing through the bearing member 33, or the contact of the valve with the bottom 15, or both, and as a result will do no more than agitate the mass; on the other hand, the valve 35 at the left in Fig. 2 will be closed by the same influences that opened the opposed valve and will carry the contents of the hopper before it to the discharge or outlet opening 16, which is the limit of its movement. The reverse movement by the arm 22 reverses the action of the valves 35, bringing the hopper contents from the opposite end of the hopper to the discharge or outlet opening 16. Hence it is manifest that the elements carried and operated by the arm 22 not only create a movement of the mass within the hoppers toward the outlet or discharge opening 16 alternately from each end of the hopper but also assist in and supplement the general mass agitation and movement within the hopper H.

The shape, size, adjustment and position of the various elements of this invention can be changed, as can also the form and construction of the hopper without departing from the spirit and scope hereof.

What is claimed:—

1. The combination with a hopper, having an outlet or discharge opening, of an oscillatory shaft arranged transversely of said hopper, an operating arm extending into said hopper and attached to said shaft for movement therewith, collars disposed on opposite sides of the lower end of said arm and pivoted thereto, a rod secured to each collar, a socket at the free end of each rod, a bearing member carried by each socket and a gate valve pivoted for co-operation with said bearing member.

2. The combination with a hopper, having an outlet or discharge opening, of an oscillatory shaft arranged transversely of said hopper, an operating arm extending into said hopper and attached to said shaft for movement therewith, a fork at the lower end of said arm, a pair of collars pivoted between the arms of said fork and extending in opposite directions therefrom, a rod carried by each collar, the combined length of said rods being such that they extend from one end of said hopper to beyond said outlet or discharge opening, a socket secured to the free end of each rod, a bearing member carried by each socket, and a gate valve co-operating with each bearing member.

3. The combination with a hopper, having an outlet or discharge opening, of an oscillatory shaft arranged transversely of said hopper, an operating arm extending into said hopper and attached to said shaft for movement therewith, a fork at the lower end of said arm, a pair of collars pivoted between the arms of said fork and extending in opposite directions therefrom, a rod carried by each collar, the combined length of said rods being such that they extend from one end of said hopper to beyond said outlet or discharge opening, a socket secured to the free end of each rod, an open bearing member carried by each socket, and a gate valve pivoted for co-operation with said bearing member.

4. The combination with a hopper, having an outlet or discharge opening, of an oscillatory shaft arranged transversely of said hopper, an operating arm extending into said hopper and attached to said shaft for movement therewith, a fork at the lower end of said arm, a pair of collars pivoted between the arms of said fork and extending in opposite directions therefrom, a rod carried by each collar, the combined length of said rods being such that they extend from one end of said hopper to beyond said outlet or discharge opening, a socket secured to the free end of each rod, an open bearing member carried by each socket, conforming in shape to the contour of the hopper bottom, and a gate valve mounted for co-operation with each of said bearing members.

5. The combination with a hopper, having an outlet or discharge opening, of an oscillatory shaft arranged transversely of said hopper, an operating arm extending into said hopper and attached to said shaft for movement therewith, a fork at the lower end of said arm, a pair of collars pivoted between the arms of said fork and extending in opposite directions therefrom, a rod carried by each collar, the combined length of said rods being such that they extend from one end of said hopper to beyond said outlet or discharge opening, a socket secured to the free end of each rod, an open bearing member carried by each socket, conforming in shape to the contour of the hopper bottom, and a gate valve pivotally mounted to control the opening in said bearing member.

6. The combination with a hopper, having an outlet or discharge opening, of an oscillatory shaft arranged transversely of said hopper, an operating arm extending into said hopper and attached to said shaft for movement therewith, a fork at the lower end of said arm, a pair of collars pivoted between the arms of said fork and extending in opposite directions therefrom, a rod carried by each collar, the combined length of said rods being such that they extend from one end of said hopper to beyond said outlet or discharge opening, a socket secured to the free end of each rod, an open bearing member carried by each socket, conforming in shape to the contour of the hopper bottom, and a gate valve pivotally mounted to control the opening in said bearing member, said gate valve being somewhat larger than said bearing member and conforming in shape to the contour of the hopper bottom.

7. The combination with a hopper, having an outlet or discharge opening, of an oscillatory shaft arranged transversely of said hopper, an operating arm extending into said hopper and attached to said shaft for movement therewith, a fork at the free end of said arm, a collar on each side of said fork, a cut-away lug on each collar, said lugs being pivoted between the arms of said fork, the cut-away portion of one lug receiving the remaining lug, a rod carried by each collar, the combined length of said rods being sufficient to extend from either end of said hopper to beyond the aforesaid discharge or outlet opening, a socket secured to the free end of each rod, a bearing member in the form of a ring depending from said socket, and a gate valve pivoted adjoining the inner face of each bearing member, said gate valve comprising a solid circular plate of a somewhat greater diameter than that of the bearing member.

8. The combination with a container for holding a plastic substance, said container having a continuously open outlet at a fixed location in the container, said outlet being free at all times for the uninterrupted passage of the contents therethrough, of reciprocating, agitating means within said container movable to and fro always beneath the level of the contents and operative both to move the contents alternately from opposite sides of said outlet toward the latter and to prevent the contents adhering to the container, said means in its operation leaving said outlet open at all times.

9. The combination with a depending operating and agitating arm, of oppositely extending rods pivoted at their inner ends to the lower end of said arm, and valves carried at the outer ends of said rods, said valves being arranged to alternately open and close as said rods are reciprocated.

10. The combination with an oscillatory operating and agitating arm, of oppositely extending rods pivoted thereto, and valves at the free ends of said rods adapted to alternately open and close during the movement of said arm.

11. The combination with a container having a bottom and inclined sides, said bottom being provided with a central outlet, and reciprocating means movable over said bottom and operative to draw portions of the contents over said bottom to said outlet alternately from opposite sides of said outlet.

12. The combination with a container, of an arm depending into the same, means for oscillating said arm, and horizontally movable one-way valve means connected to said arm and movable to and fro in response to the oscillations of said arm, said arm and valve means together constituting agitating means within said container.

13. The combination with a container having a bottom, a reciprocating one-way valve member movable upon said bottom to move portions of the container contents, a rod secured at one end to said member, an arm pivotally connected at its lower end to the free end of said rod, and an oscillatory shaft above the container to which the upper end of said arm is rigidly secured, said arm, rod and member constituting agitating means within said container.

14. The combination with a container having a bottom, an oscillatory shaft above the container, an arm rigidly secured to said shaft and depending into said container, oppositely extending rods pivotally secured at their adjacent ends to the lower end of said arm, and one-way valve members secured to the outer ends of said rods and movable upon said container bottom as the parts oscillate, said arm, rods and members constituting agitating means within said container.

15. The combination with a container for holding a plastic substance, having side walls and a bottom having a discharge outlet, an oscillating member depending into said container and adapted to extend into the container contents, and a reciprocating one-way valve member operatively connected at one point to said oscillating member and free at another point to engage said bottom and to travel to and fro upon the same under the action of gravity and in response to the movements of said oscillating member, all of said movements being wholly beneath the level of said contents, thereby serving to agitate the contents and to convey the same to said outlet by removals from the lower portions thereof.

16. The combination with a container having a bottom provided with an outlet, an oscillatory supporting member, two reciprocating members operatively connected to said supporting member and extending into engagement with said bottom on opposite sides of said outlet, said engagement being produced by gravity, and said members operating in their movements toward said outlets to convey container contents toward said outlet and in their movements in the opposite direction to pass freely through the container contents.

17. The combination with a container having a bottom provided with an outlet, two reciprocating members free to engage said bottom under the force of gravity and movable upon said bottom, one on one side of said outlet and the other on the other side, to convey container contents toward said outlet when moving toward the same and to pass freely through the container contents when moving in the opposite direction, and means for operating said members to alternately convey container contents toward said outlet.

18. The combination with a container for holding semi-frozen substances in a plastic condition, having an inlet at its top and an outlet at its bottom through which the substances may be supplied and discharged, respectively, said outlet having a fixed location in the container and being always open for the free passage of the contents therethrough, refrigerating means for maintaining the substances in said semi-frozen plastic condition, and reciprocating, agitating and conveying means movable upon and guided by said bottom and operative, without closing said outlet at any time, both to keep the entire contents from setting, freezing hardening and adhering to the container walls and to convey the contents to said outlet by removals of the lowermost portions whereby the upper masses will settle down and take the place of the removed portions and thus a slowly moving stream will be maintained through the container.

19. The combination with a multi-compartment container having downwardly converging walls and elongated bottoms having central outlets, reciprocating means in each compartment for traveling upon the associated bottom to draw the compartment contents from the opposite ends of the compartment into the associated opening, and common operating means for all of said reciprocating means.

20. The combination with a multi-compartment container having downwardly converging walls and elongated bottoms having central outlets, one-way valve members movable to and fro upon the bottom of each compartment to draw the compartment contents from opposite ends of the compartment to the compartment outlet, a common driving shaft extending across said compartments, and connecting means between said shaft and said members for operating said members in response to the operation of said shaft.

JULIUS JOHN MOJONNIER.
HARLEY RAY PHILLIPS.